April 18, 1944. E. A. LUXENBERGER ET AL 2,347,117
APPARATUS FOR PRODUCING RUBBER ARTICLES
Filed Aug. 2, 1940 4 Sheets-Sheet 1
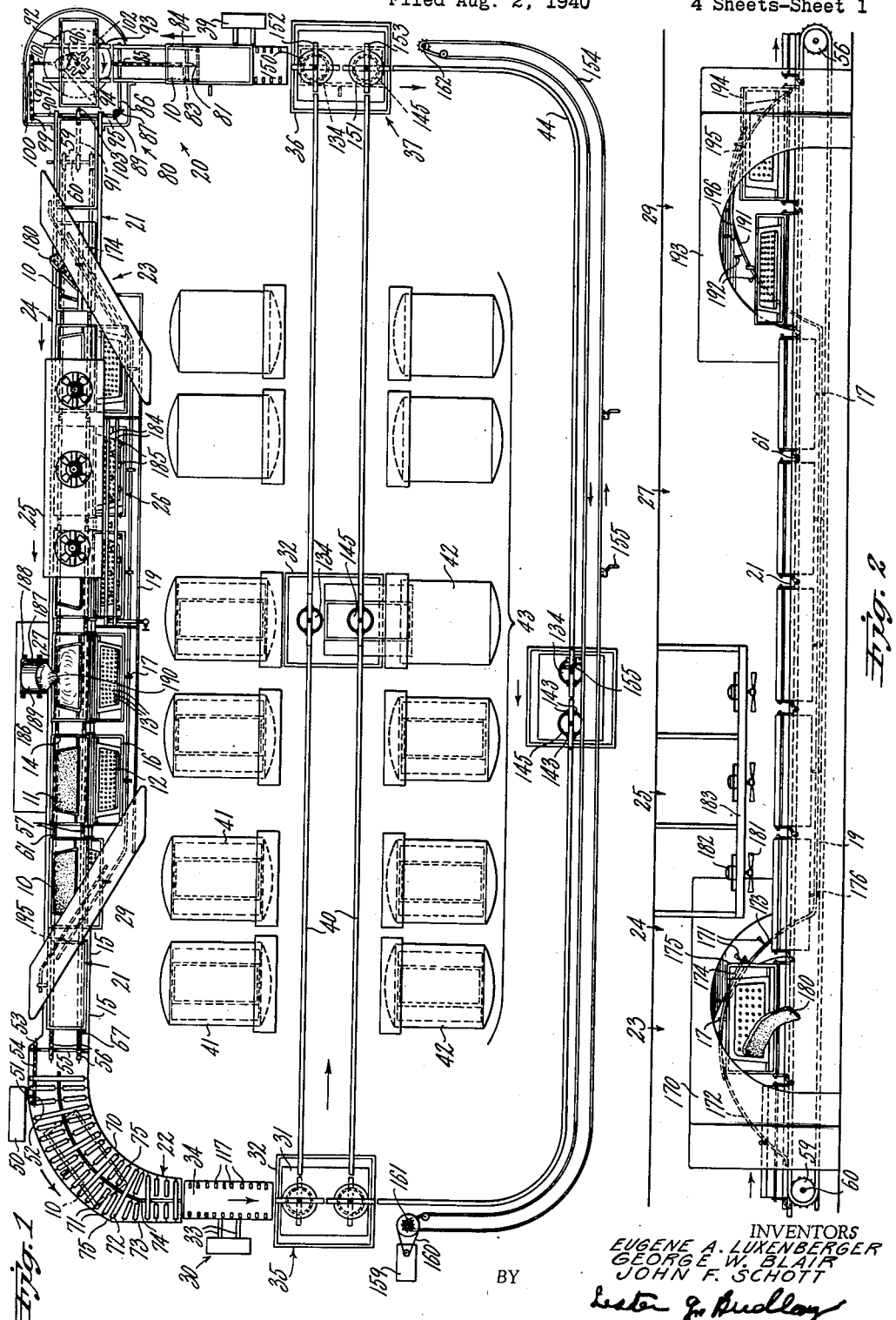
INVENTORS
EUGENE A. LUXENBERGER
GEORGE W. BLAIR
JOHN F. SCHOTT
BY
Lester J. Dudley
ATTORNEY.

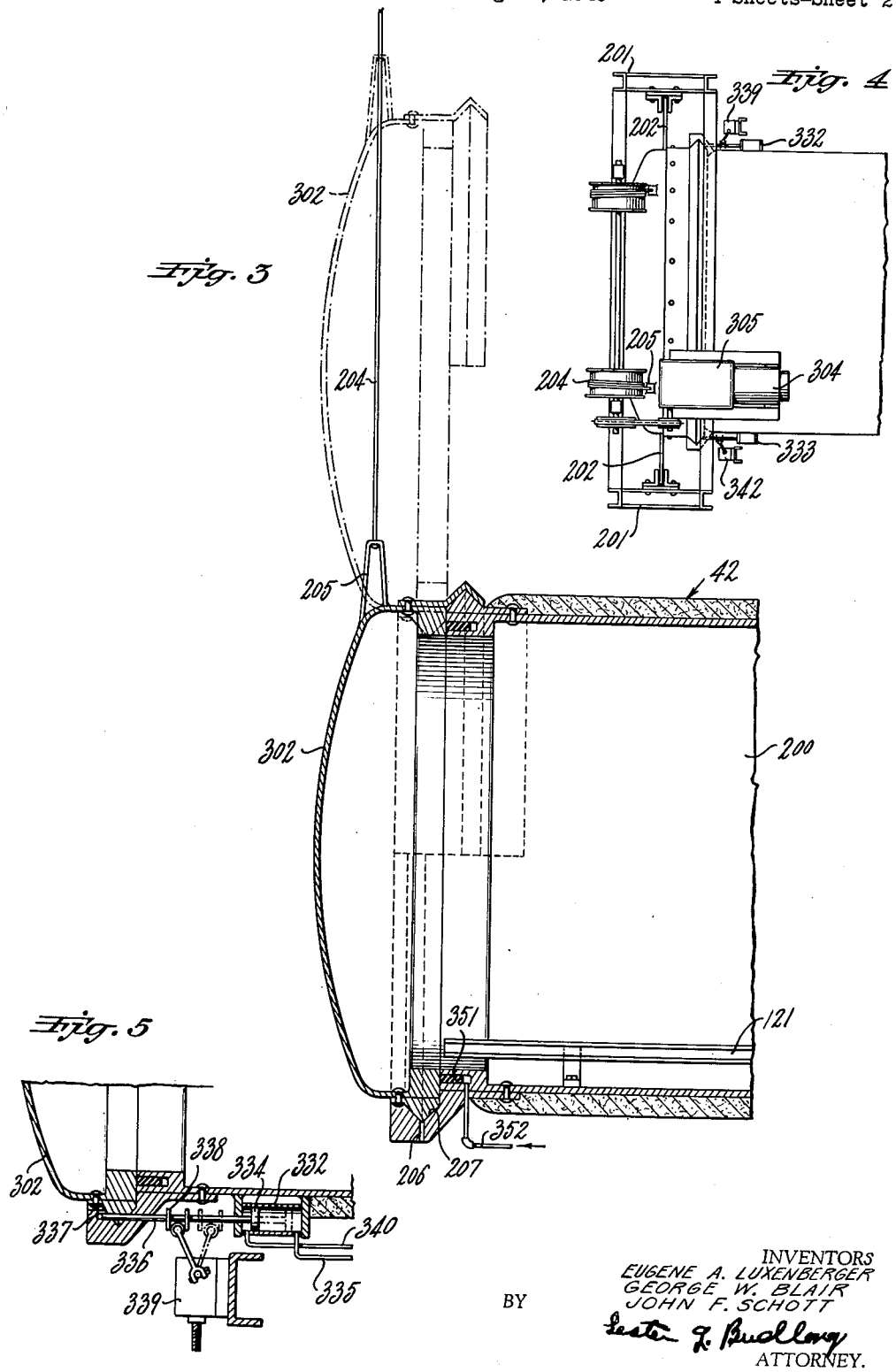

April 18, 1944. E. A. LUXENBERGER ET AL 2,347,117
APPARATUS FOR PRODUCING RUBBER ARTICLES
Filed Aug. 2, 1940 4 Sheets-Sheet 3

INVENTORS
EUGENE A. LUXENBERGER
GEORGE W. BLAIR
JOHN F. SCHOTT
BY Lester J. Budlong
ATTORNEY Patented Apr. 18, 1944

2,347,117

UNITED STATES PATENT OFFICE 2,347,117

APPARATUS FOR PRODUCING RUBBER ARTICLES

Eugene A. Luxenberger, George W. Blair, and John F. Schott, Mishawaka, Ind., assignors to United States Rubber Company, New York, N. Y., a corporation of New Jersey Application August 2, 1940, Serial No. 349,748

2 Claims. (Cl. 18—4)

This invention relates to molding apparatus, and particularly to continuous apparatus for the production of vulcanized rubber articles, especially where sponge rubber articles are manufactured in a cyclic process from foamed or frothed latex. The apparatus comprises a series of stations at which the various consecutive operations are carried out on one or more molds. The stations are positioned along a closed continuous circuit, and molds are conveyed from station to station at the desired rate. The operating mechanisms at the various stations may be synchronized with the speed of transfer of the molds from one station to the next. The process carried out by the present apparatus is cyclic and continuous, that is, the same series of molds may be repeatedly employed for the production of a large number of articles without removal of any mold from the apparatus. The cycle of operations upon a mold and the material contained therein is such that, when completed, the mold is returned to the initial station in condition for the production of a substantially identical article to the article just completed.

The process involves preliminary preparation of a latex foam ready for pouring into a mold. An open mold is filled to the desired height with a quantity of latex foam, is closed and is transferred during at least part of a coagulating period to a vulcanizer. Coagulation is controlled as to time so that it is completed before vulcanization has commenced. The latex is preferably prepared with the desired ingredients, such as a delayed coagulant for latex and the usual antioxidants, vulcanizing ingredients, etc. At the vulcanizing station, a newly introduced mold is retained at low temperature, such as at substantially atmospheric temperature, for a sufficient time to induce complete coagulation of the latex foam mix. The thus set article is then subjected to an elevated temperature in the presence of steam until the desired degree of vulcanizing is obtained. The mold with the vulcanized article is then withdrawn from the vulcanizer at the vulcanizing station and is returned toward the initial pouring station. The mold is automatically opened in transit, the vulcanized article removed therefrom and the mold is finally cleaned and cooled, if necessary, whereupon it is in condition for a repetition of the cycle.

The apparatus includes generally a mold filling station, a mold closing station, a vulcanizing station, including means for insuring complete coagulation of the latex foam, a mold opening station, an article removing station, and a cleansing or cooling station, all of such stations being arranged in a circuit in the named order.

The vulcanizing station has timing means for the coagulating and vulcanizing stages synchronized with the rate of feed of unfinished articles from the preliminary stations thereto. When an article or a plurality of articles are introduced into a vulcanizer which may comprise one of a bank of vulcanizers constituting the entire vulcanizing station, a monitor by one movement may initiate the following automatic operations. First, the vulcanizer is closed, next it is sealed, then a coagulating period elapses to insure that the article is set in the proper shape by the mold. The air is then exhausted from the vulcanizer and steam is introduced. The temperature and pressure of the steam are automatically controlled while the vulcanizing operation is in progress, to insure uniformity of articles produced and synchronization of the vulcanizing stem with the other stages in the process, correlation of the rate of transfer of the article from one station to another, and, finally, the production of articles having the desired characteristics.

The instrumentalities for successive operations by the mechanisms of the stations in identical sequence upon a series of articles include the conveying means which operate both within and outside of the circuit described. The molds are transferred at a constant rate of speed from one station to another with the exception of the vulcanizing station. Before reaching the vulcanizing station each mold is transferred manually to a truck which rides in an endless truck track. The truck carries the mold, preferably together with a number of similarly filled other molds having at least partially coagulated material therein, along the truck track to an open vulcanizer. The entire truck including the desired number of filled molds is introduced manually into the vulcanizer, whereupon the vulcanizing operations are carried out while the molds are in a stationary position within the circuit. When the vulcanizing operation has been completed the door of the vulcanizer automatically opens and the truck is withdrawn manually and transferred along the truck track to a distributing point where the individual molds are redealt onto the continuous conveyor for return to the pouring station after automatic opening and after removal of the vulcanized articles therefrom. From the distributing point the empty truck is transferred automatically around the endless truck track to the original receiving point to collect a new batch of molds containing unvulcanized articles.

The apparatus provides a continuous method of producing a plurality of identical molded articles with a minimum of manual operations, thereby insuring speed of production and uniformity of product. With the apparatus a large variety of sponge rubber articles may be produced such as chair seats, mattresses, automobile cushions, etc. One of the advantages of the apparatus is its adaptability to speed up production while maintaining the results of the operations by various stations at a constant.

A preferred embodiment of the invention may be understood by reference to the accompanying drawings, of which:

Fig. 1 is an overall plan view of the apparatus;

Fig. 2 is an elevation taken along the upper side of the apparatus as shown in Fig. 1 including the opening, removing, cleaning and cooling, pouring and closing stations;

Fig. 3 is a vertical cross section of one vulcanizer, showing the door in open position in dotted lines;

Fig. 4 is a top view of a vulcanizer, including mechanism and framework for opening and closing the door.

Fig. 5 is a detail of an automatic locking device for the vulcanizer door;

The general apparatus

Figure 6:
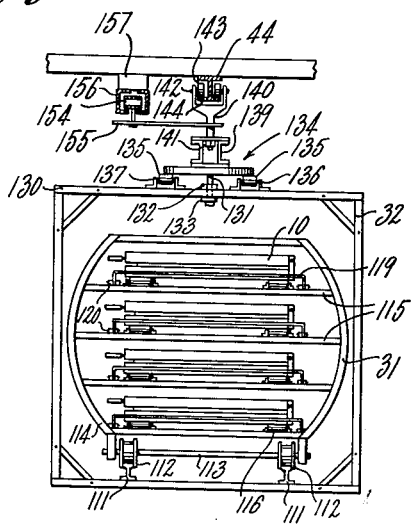
Fig. 6 is an end elevation of a filled truck and truck track.

Molds 10 (Figs. 1 and 6) comprise a lower mold section 11 and an upper mold section 12 having projections 13 thereon extending into the lower mold section when the mold is closed. The lower mold section 11 is fastened to a lower frame 14 longitudinally hinged at 15 to an upper frame 16 which holds the upper mold section 12. The upper frame 16 carries a handle 17 adapted to engage cams for the opening and closing of the molds in transit. If desired, the handle may be constructed as a roller which rides along a support bar 19 while the mold is open and also during the process of opening or closing.

The molds travel along tracks 20, 21 and 22 (Fig. 1) in the portion of the circuit including opening station 23, removing station 24, cooling station 25, cleaning station 26, pouring station 27 and closing station 28.

An elevator 30 (Fig. 1) receives a mold from the track 22 and raises it to the desired level of a multi-level truck 31 which is carried by a truck frame 32 (Fig. 6) for transfer to the vulcanizers 41 or 42. The elevator may be manually operated or powered by any desired means so long as those means do not interfere with the transfer from the track 22 into the truck frame 32. For example, the usual elevator 30, firmly secured to the floor, may have laterally extending brackets 33 holding a horizontal platform 34 interposed in the path between the track 22 and the truck frame 32. The truck frame 32 is at a receiving point 35 (shown at the left side of Fig. 1). A similar truck frame 36 is shown in position (at the right side of Fig. 1) at a distributing point 37. A corresponding elevator 39 is shown with a mold 10 partly emerging therefrom onto the track 20.

Extending between the receiving point 35 and the distributing point 37 are tracks 40 for the transfer of truck frame 32 to the vulcanizers and then to the position of the truck frame 36. The vulcanizers or vulcanizing tanks 41 are aligned along one side of the track and vulcanizers 42 along the other side, all of which together comprise a vulcanizing station 43. A return track 44 is provided for the transfer of the truck frame 36 back to the position of the truck frame 32 after the molds have been removed.

A mold is automatically propelled along tracks 20, 21 and 22 from the elevator 39 to the elevator 30. A number of molds are placed on shelves of the truck 31, and the truck is manually moved along the track 40 to one of the vulcanizers 41 or 42. The truck 31 is then wheeled from the truck frame 32 into a vulcanizer and the vulcanizing operations are initiated. In order that the track 40 may be clear for subsequent delivery of another group of molds into a different vulcanizer, the empty truck frame 32 may either be directly transferred to the distributing point 37 and thence back along track 44 or it may be shifted to a different vulcanizer to receive a truck containing molds with vulcanized articles. Considerable flexibility of operation is thus obtainable since the number of vulcanizers used may depend on the rate of travel of the molds 10 around the portion of the circuit exclusive of the vulcanizing station 43. The operating circuit comprises all of the stations and tracks except the return track 44 for the empty truck frames.

The continuous transferring means

As shown in the upper left hand corner of Fig. 1, a motor 50 drives a shaft 51 carrying the sprocket 52 which drives a sprocket 53 by a chain 54. The sprocket 53 is keyed to a drive shaft 55 carrying driving sprockets 56 supported in the track framework. As shown best in Fig. 2, drive chains 57 are driven by the driving sprockets 56 and are supported at the other end by idler sprockets 59 keyed to a shaft 60. The shafts 55 and 60 may be mounted in any suitable known manner on the framework holding the track 21. The drive chains 57 carry hooks or dogs 61 spaced far enough apart so that each dog may engage only one mold frame for a mold 10.

As shown in Fig. 1, between the mold closing station 29 and the elevator 30 is a turn 70 having drive rollers 72 and a plurality of rollers 71 which may idle or be driven as desired. The shafts for the drive rollers 72 may extend entirely across the frame 73 of the turn, while the rollers 71 may be supported between an intermediate curved brace 74 and one side of the frame 73. The drive rollers may be driven by any suitable means from the drive chains 57, as by chains connected to the motor drive shaft 51. The track 22 may comprise upstanding flanges 75 to hold trays in proper position while travelling around the curve 70. It will be noted that the track 22 is so proportioned that it will hold more than one mold, thereby allowing sufficient time for the elevator platform 34 to deposit the desired number of oncoming molds into the various levels of the truck 31.

Referring to the right hand side of Fig. 1, it will be seen from the position of the mold handle 17 that molds on the track 20 are reversed with respect to those on the tracks 21 and 22. So that the mold handles may be on the proper side of track 21 in order to engage the mechanism of the opening and closing stations 23 and 29 respectively, a turning device 80 is provided.

Molds are withdrawn from the platform of the elevator 39 and fed to the turning device by hooks or dogs 81 secured to an endless chain 82 supported at one end by a sprocket 83 revolving on a shaft 84 supported in the framework beneath track 20. The chain 82 is driven by a drive sprocket 85 keyed to a shaft 86, which in turn is driven through miter gears 87 and 89 by a shaft 90 supported on the end of the frame for the track 21. The shaft 90 is driven through a chain 91 and appropriate sprockets by the shaft 60 which supports the sprockets for the drive chains 57.

The turning device 80 may be of any suitable form and is synchronized with the chains 82 and 57. For example, a turntable 92 having cross tracks 93 is driven by a Geneva wheel 94 and corresponding cam 95 having a positioning pin 96. The rate of turn of the turntable 92 is determined by a chain 97 driven by sprocket 99 keyed to the shaft 90 and in turn driving a sprocket 100 which is geared to drive shaft 101. The drive shaft 101 is geared to drive the vertical shaft 102 keyed to the Geneva cam 95. A hook 103 on the chain 91 extends beneath the forward edge of the mold frame to engage the frame when the cross track 93 has turned the mold 90 degrees. The length of the drive chains 91 and 82, carrying hooks 103 and 81 respectively are so selected that by the time a mold has been placed on track 21 from the turntable 92 a succeeding mold is in position to enter the turntable at right angles to the first mold, thus preventing interference. The shaft 84 is positioned far enough away from the turntable so that, while the cross track 93 is in intermediate turning position, a mold will not have passed far enough along the track 20 to enter the turntable until the turntable has been freed of the preceding mold.

Truck transferring means

The only portion of the operating circuit traversed by the truck frames 32 is along the track 40 including the receiving and distributing points 35 and 37, and back along the return track 44. The mode of travel of the truck frames and trucks will be understood by reference to Fig. 6.

The tracks 40 and 44 are overhead tracks which may be suitably supported by framework 110 suspended from the ceiling. The bottom of the truck frame 32 carries a pair of short sections of track, 111, 111 to support wheels 112, 112 on rotatable axles 113 journaled in the framework 114 of the truck 31.

The truck 31 has a plurality of shelves 115 for the reception of molds 10. Each of the shelves preferably carries suitable anti-friction rollers 116. The platforms of the elevators 33 and 39 carry corresponding rollers 117, mounted in any convenient manner such as by journaling their axles in the longitudinal frame members of the platforms. The elevator is raised or lowered to the proper height to select the proper shelf 115 for insertion or removal of a mold into or out of the truck, as by a manual sliding operation. At one or both ends of the shelf 115, are mounted longitudinal stop rods 119, for example, by hinges 120. The stop rods may be swung up into operative position after a tray or mold has been inserted and may be swung down below the upper level of the rollers 116 when molds are being inserted or removed.

Tracks 121 (Fig. 3) are supported from the floor of each vulcanizer 42 to receive a truck 31 merely by wheeling it out of the truck frame 32. If desired, auxiliary tracks may be temporarily interposed between the ends of tracks 111 and 121 to facilitate transfer of a truck full of molds between the truck frame and the vulcanizer, thereby insuring proper positioning of the truck within the vulcanizer.

The truck frame 32 has a ceiling 130 through which a pair of threaded support rods 131 extend and are rotatably secured in position by upper and lower nuts 132 and 133. The top of the upper end of each support rod is secured by any desired means to a turntable head 134 for rotation of the head about or with the rod. Rollers 135 are supported on the top of the ceiling 130 by brackets 136 holding shafts 137. The lower edge of the periphery of each turntable head 134 engages the rollers as it is rotated relative to the truck frame 32. The turntable head has secured thereto a beam 139 suspended by the lower arm of a yoke 140 and rotatably secured by bolt 141. The upper arms of the yoke each carry a shaft 142 supporting pairs of rollers 143 which rides on a flange 144 of the track 44. As shown in Fig. 1, one of the pair of the turntables 134 is positioned near one end of the truck frame 32, and the other turntable 145 is mounted near the other end.

When the truck frame is travelling along the track 40, the beams 139 and 146 are parallel to the tracks, one beam corresponding to each track. At the receiving and distributing stations 35 and 36 respectively, the beams may be aligned by turning them at right angles. Suitable manual or mechanical means may be utilized to perform the turning operation. As the track frame travels along the track 44, the beams are aligned, so that during this return operation of the track frame cycle, the truck frame rides on a single track.

At each of the receiving and distributing stations 35 and 37 respectively are a pair of turntables 150 and 151, corresponding to the pair of tracks 40. Track connections 152 and 153 are suspended from the turntables which are rotatably secured to the framework 110. The track connections may be rotated for alignment either with respect to the two tracks 40; or may be turned at right angles so that they are aligned with respect to each other and to the track 44. Thus a truck frame may be transferred from along the track 40 where each set of wheels 143 rides on one of the tracks, onto the track connections 152 and 153 as shown by the position of the truck frame 36. The turntables 150 and 151 may then be turned 90°, whereupon a truck frame may be removed from the track connections and returned from position 37 back to position 35. For driving a truck along track 44, an endless drive chain 154, having a series of drive arms 155 may be suitably supported in known manner by a guide 156 to follow the path of the track 44. The guide 156 may be supported from the rafters or the superstructure 110 by brackets 157. A motor 159 may be provided with a chain drive 160 to drive a sprocket 161 meshing with the links of the drive chain 154. The opposite end of the course traversed by the drive chain may be free or driven, as desired, to revolve with a sprocket 162.

The operating stations

Observing Fig. 2 from left to right, various operating stations appear with a series of molds being transferred along the track 21 in the direction of the arrows. The opening station 23 comprises a tunnel 170 supporting, by brackets 171, a pair of arched cams 172 and 173 having substantially parallel portions at their upper ends, and defining a space 174 therebetween for the guidance of a mold handle 17. As a mold is driven by hook 61 along track 21, the handle 17 engages the upper edge of the cam 172, which is shaped like a guide rail, and the upper section 12 of the mold is raised into the vertical position as shown in the case of mold 175. As the mold progresses, the mold section is opened even farther and the weight of the handle is shifted over to cam 173 which lowers it gradually, until it rests, as shown, with handle 17 at 176 on the lower horizontal guide rail 19. A cushion or other article 180 may be removed as soon as the jaws of the mold have been separated a sufficient distance. Thus the forwardmost part of the mold opening station 23 may coincide with and constitute the removing station 24.

The articles are manually stripped from the molds at the removing station 24. Since the mold projections 13 in the upper mold section 12 extend into the article 180, the entire article is often automatically lifted bodily from the lower mold section 11, so that the entire manual stripping takes place from the upper mold section.

The cooling station 25 comprises one or more fans 181 driven by motors 182 which are supported by any suitable framework 183 suspended from the ceiling.

The cleaning station 26 may comprise a plurality of pipes (see Fig. 1) 184 from which nozzles 185 extend and point toward the interior of the open upper mold sections. Steam, hot water, or compressed air may be used in conjunction with the nozzles to remove pieces of sponge rubber material which may have been caught between the mold projections 13. These automatic operations may be supplemented by manual operations both on the upper mold sections 12 and the lower mold sections 11. If liquid cleaning means are employed, the molds should be dried before reaching the pouring station 27. The cooling and washing operations may be carried out concurrently or successively as desired. In case they are successive, the track 21 may be elongated and the cleaning station may be positioned adjacent to the cooling station instead of coincident therewith.

The mold-filling or pouring station 27 may be employed in conjunction with a platform 186 on which pouring means may be either fixedly or movably mounted. As shown in the drawing, a truck 187 riding on wheels 188 may support a tiltable vat or tank 189 having a lip 190 adapted to extend over the lower mold section 11. As the molds travel in the direction of the arrow along the track 21, the truck 187 may be wheeled along the platform 186 while pouring latex foam into the mold. The truck may be withdrawn for refilling as their contents are used, and other trucks supplied.

The mold closing station 29 operates similarly to the mold opening station 27. When the handle 17 of a mold reaches the forwardmost end of the horizontal guide rail 19 it engages the upper surface of a cam 191, corresponding to the cam 172 and supported by brackets 192 in a tunnel or frame 193. After the empty upper mold section shown in the position 194 has reached the vertical position it travels for a moment in a space 195 between the cam 191 and a cam 196 corresponding to the lowering cam 173. At the end of the path of the lowering cam 196, the mold is entirely closed and remains so by virtue of the weight of the upper mold section 12 and of its frame 16.

The mold is then directed past the sprocket 56, is continued around the curved track 22 by the driving rollers 72, and is finally deposited onto the elevator 34. The entire series of molds along track 20, or along track 21 or along track 22 may be positioned to insure that a mold will not be jammed across the space at the end of track 22 while the elevator is in operation.

*The vulcanizing station and controls*

The vulcanizers 41 and 42 each comprise a cylindrical tank or chamber 200 having a circular door or gate (indicated in Fig. 3 in dotted lines when open), which may be raised or lowered by sliding in a frame 201. Brackets 202 retain the door in proper position at all times with respect to the frame 201. At the top of the frame, hoist reels 203 are motor driven to wind or unwind hoist wires 204 secured at their lower end to brackets 205 on the top of the vulcanizer door. A drain 206 may be provided at the door opening to prevent accumulation of condensed steam in a trough 207 which receives the edge of the door when closed.

The vulcanizer is automatically operated once its cycle of operations has been initiated by an operator pushing a button. The cycle of vulcanizing operations, including completion of the gelling period for the latex foam, may be adjusted, as by controlling the time and temperature thereof, to synchronously conform with rate of molds being operated upon by the other stations, while still maintaining the operating conditions at optimum value. For example, the rate of vulcanization may be speeded up when the rate of travel of vulcanizers through the other stations is increased.

In Figs. 3 and 5, 302 designates the door of the vulcanizing tank 42. The door 302 is driven up and down in frame 201 by a motor 304 actuated in either direction by a door operating relay 305 (Fig. 4). Steam is admitted to the tank at 306 and controlled by a valve 309 to be described, and condensed water drained from the tank at 311, through a condensate chamber and control valve 317, to be described. A vent 313 at the top of the tank communicates with an exhaust stand indicated by arrow 315, through a vent control valve 316, to be described.

The cycle of operations performed on the tank 42 is as follows. After uncured articles have been placed in the tank 42 ready for vulcanization, the door 302 is closed and locked. The temperature and pressure within the tank are maintained normal until sufficient time has elapsed to complete gelling or coagulation of the latex foam in the mold, thus forming an unvulcanized shaped article. The vent 313 is left open and steam is supplied through the steam inlet 306, blowing the air out through the vent. When the tank has been filled with steam, the vent valve 316 is closed by a thermostatic control, to be described and the temperature is thereafter permitted to rise to the desired predetermined level. During the vulcanizing period the temperature within the tank is maintained constant by controlling the steam valve 309 and condensate valve 311 controlling a pipe line 319 leading to the condensate discharge outlet indicated by the arrow 320. When the temperature within the vulcanizer has been maintained for predetermined length of time, steam valve 309 is shut off, the vent 313 is opened, the door is unlocked, and after the pressure returns to zero, the door 302 is raised, and the vulcanized articles may be withdrawn together with their enclosing molds. The automatic operations just described are performed by the following instrumentalities.

A push button switch 321 (Fig. 8) starts the closing of the door 302 and commences the operation of a timer 322. The timer initiates each step in the operations and determines the length of time allowed within the vulcanizer. A vent controller 323 is provided for operating the vent valve 316 in response to the temperature within the tank which is relayed from a thermometer 324 through a thermometer connection 325. During the vulcanizing cycle, a temperature and condensate control 326 determines and records the temperature within the tank by controlling the steam valve 309 and condensate valve 317 in response to the indication of a thermometer 327 through a thermometer connection 329; and the indications of a thermometer 330 and thermometer connection 331 within the condensate chamber 312. The temperature and condensate controller 326 takes over from the timer the control of the steam inlet 306 through valve 309 and the condensate drain 311 through valve 317 during the vulcanization stage of the cycle.

Figure 8:
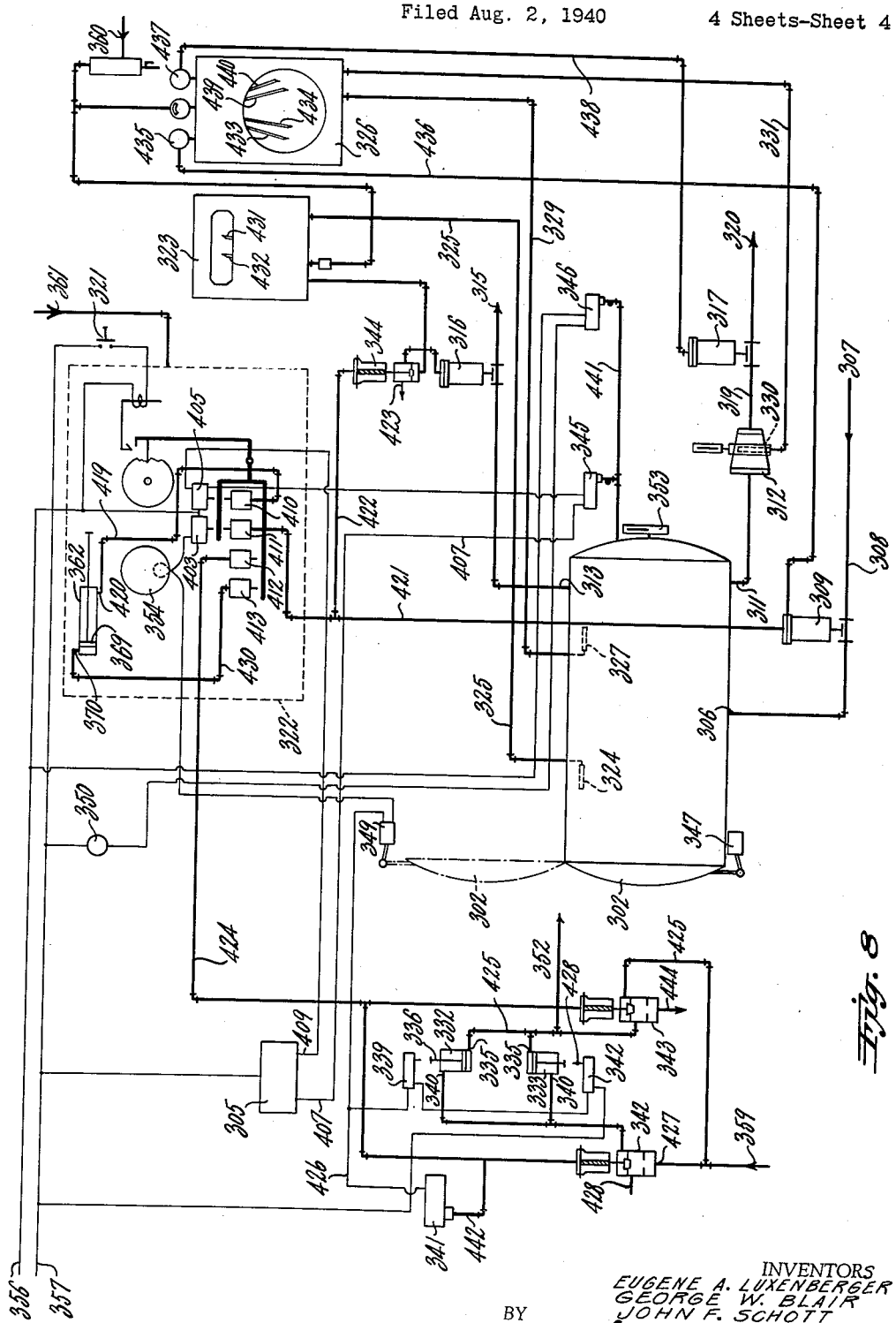
Fig. 8 is a diagrammatic view of the apparatus for controlling the operations of the vulcanizer.

The vulcanizer door is locked by two cylinder locks 332 and 333, diagrammatically shown in Fig. 8 out of position for purposes of clarity. Lock 332 is shown in structural relation to the door in Fig. 5. When the door 302 is closed a piston 334 within the cylinder 322 may be forced forward by introducing air into a rear inlet 335 to drive a latch plunger 336 through a latch slide 337 in the side of the door. When the piston is all the way forward, so that the door is locked, the plunger closes a normally open spring switch 339 to permit the completion of control circuits, to be described. When it is desired to unlock the door, air is forced through a forward inlet 340 into the cylinder 332 to retract the piston and the switch 339 springs back to its normal open position. A normally closed pressure switch 341 is interposed between the timer 322 and one side of the electric power line.

Three-way pilot valves 342 and 343 indirectly control the operation of the cylinder locks 332 and 333. Another three-way pilot valve 344 permits the operation of the vent valve 316 by the vent controller 323. A fluid pressure switch 345, closed at low pressure is employed as safety device for preventing the opening of the door 302 while there is still pressure in the vulcanizer at the end of the cycle after the vent 313 and the locks 332 and 333 have been opened. A normally closed door motor limit switch 347 is tied in with a normally closed limit switch 349 for stopping the door motor 304 at the lower and upper positions of the door respectively.

A signal lamp 350 lights when there is pressure in the vulcanizer through normally open pressure switch 346. A door gasket (see Fig. 3) 351 may be pressed into sealing position against the door after it is closed by the application of air through pipe 352. A thermometer 353 communicates with the interior of the tank at the rear thereof to indicate the temperature in the tank.

The controlling mechanism is actuated by an electrical circuit, of which there is only one main power line; and air which is supplied into three separate circuits by three separate air supply lines to be described below.

Electric power is supplied to the controls by lines 356 and 357, and is used to operate timer clock 354, the lamp 350, a timer cam 355 and the door operating relay 305. There are three sources of air supply to the various control mechanisms, the pressures in the various air lines being determined generally by their various functions. A high-pressure air supply 359, for example of the order of 85 pounds per square inch, operates the door gasket 351 and the door locks 332 and 333, depending on the position of the pilot valves 342 and 343. A relatively low pressure air supply 360, for example of the order of 25 pounds per square inch, is fed into the vent controller 323 and simultaneously into the temperature and condensate controller 326. The vent controller 323 closes the vent valve 316 by passing air thereto from the supply 360, so long as the pilot valve 344 maintains the line open in a manner to be described below. Similarly, the controller 326 opens and closes the steam inlet valve 309 and the condensate drain valve 317 by applying or releasing air pressure from the supply source 360. An intermediate air supply 361, for example 35 pounds pressure more or less, feeds directly into the timer 322 whereby air may be distributed by the timing mechanism, that is, by the operations of the cam 355, to the pilot valves 342, 343 and 344, and to a resetting cylinder 362 within the timer. The timer as a whole is shown in Fig. 8 as enclosed by a dotted rectangle 322. The air line 361 is directly connected to each of the valves within the timer and thence to the pilot valves, although for the sake of clarity in the drawing the line 361 is shown as stopping at the outside of the timer 322.

Figure 7:
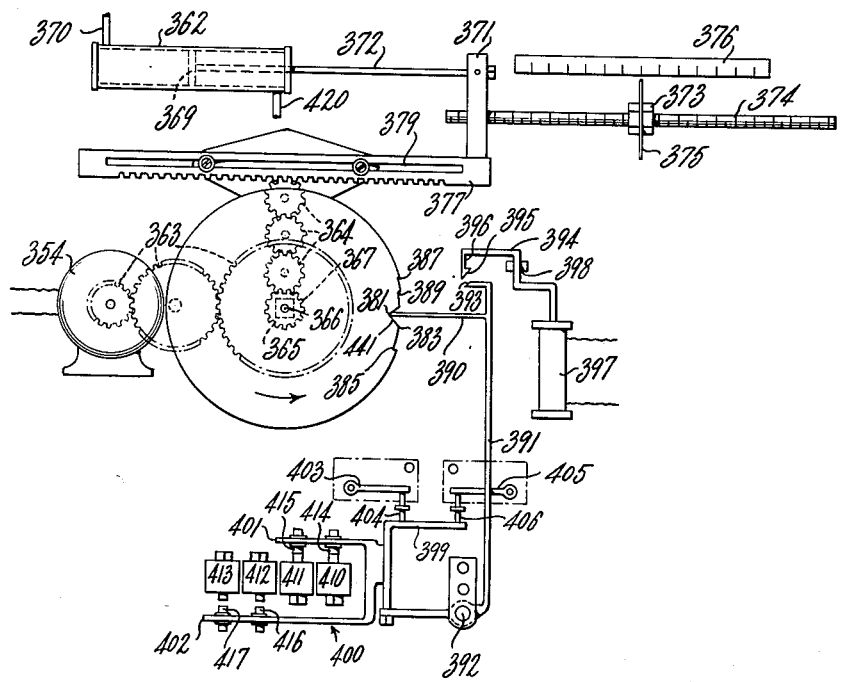
Fig. 7 is a semi-diagrammatic view of the automatic controlling mechanism for the timing of the various operations of the vulcanizer.

Although other timers may be employed, a suitable timing mechanism is the type manufactured by the Taylor Instruments Company and designated for sale as "Type 52-R." Referring particularly to Fig. 7, the cam 355 is connected by any desired arrangement, such as gears 363, to the electric clock motor 354. The cam 355 may also be rotated by a timing device including a cylinder 362 to actuate gears 364 in mesh with a gear 365 connected to the cam shaft 366 by a clutch 367. A timing piston 369 in the cylinder 362 may be driven forward to set the timing of the vulcanizing period by introducing air under pressure at the rear inlet 370 in the cylinder until a bar 371 on a piston rod 372 of the piston 369 hits a variable stop nut 373 movably mounted on a threaded rod 374. An indicator 375 on the stop nut shows its position relative to a scale 376 which is calibrated in "minutes of cure." The bar 371 fixed on the piston rod carries a toothed rack 377 slotted at 379 to receive supports 380, and which meshes with the uppermost gear 364. As the piston travels forward (to the right in Fig. 7), the rack 377 likewise rides forward, driving the gear 364 and rotating the cam 355 an amount determined by the position of the stop 373.

The periphery of the cam is notched at positions 381, 383, 385, 387 and 389, which determine the operations of the cycle performed automatically by each vulcanizer 42. A cam follower 390 is supported by a branched timing lever 391 which is pivoted at 392. The upper terminal 393 of the timing lever 391 may be engaged by a catch 394 having a tapered terminal-engaging surface 395 and a notch 396. The catch may be actuated vertically by a solenoid 397 and held in the downward position by a latch 398 to withdraw the cam follower halfway out of the notch 381 as the cam 355 rotates in the direction of the arrow. Further right-hand movement of the terminal 393 will disengage the latch 396 and allow return to the normal upward position. The side of the lever 391 to the left of the pivot 392 carries an arm 399 and a bifurcated yoke 400 comprising an upper arm 401 and a lower arm 402. A single pole single throw normally open switch 403 has a depending adjustable tappet 404 and may be raised into the closed position by the arm 399 to close the circuit leading from the electric power line 356 to the relay in the limit switch 347. A single pole double-throw switch 405 may be shifted from the lower to the upper position by raising an adjustable tappet 406 by the arm 399. When the switch 405 is in the lower position, the electric power line 356 is closed as far as pressure switch 345, which is in normally closed position when the pressure is zero and completes the circuit through the opening side 407 of the door operating relay 305 (see Fig. 8). When the switch is in the up position, that is, when the arm 399 is raised, that circuit is broken and a circuit is made from the line 356 directly to the closing side 409 of the door operating relay 305. A series of diaphragm valves 410, 411, 412, and 413 are all connected to the air supply 361 and are actuated by the movement of the yoke 400 of the pivoted frame 391. These valves are open when their valve stems are pressed inwardly, and closed when the stems are in the "out" position. When the left side of the frame is all the way down, tappets 414 and 415 hold the valves 410 and 411 open since the upper arm 401 is down; and the valves 412 and 413 are held in their closed position since the tappets 416 and 417 are "out" by virtue of the depressed position of the arm 402. Each of these valves is provided with an air-leak arrangement so that when the pressure is taken off of its diaphragm valve, the air in the line may be dispelled.

When the valve 410 is open, air from the supply passes through a pipe 419 and into the cylinder 362 through an inlet 420 to force the piston 369 into the "in" position (Fig. 8). When valve 411 is open, air from the supply 361 enters main pipe line 421 and branch line 422; pressure in air line 422 actuates the diaphragm of the pilot valve 344 to open a vent 423 of the vent valve 316 which assumes its normally open position; pressure in air line 421 actuates one of the two diaphragms of the steam valve 309 to close that valve. When the valve 412 is opened, air is admitted from the source 361 through a pipe 424 to depress the diaphragm of the pilot valve 343, thereby opening a line 425 between the air supply 359 into the rear inlets 335 of the cylinders 332 and 333 to lock the vulcanizer door and into the pipe 352 for the door gasket 351. Air pressure also is admitted through a pipe 426 to the diaphragm of the pilot valve 342, closing off an inlet 427, and opening a vent in valve 342. This permits the forward inlets 340 of the door locks 332 and 333 to vent at opening 428 in valve 342 to permit the locks to be pushed out into locking position. When the valve 413 is open, air is fed from the air supply 361 through a pipe 430 to the rear inlets 370 of the cylinder 362.

The vent controller 323 may be of the type sold by the Taylor Instrument Company as the "Fulscope Indicating Controller" No. 87-R, (Type 3) and has a limit hand 431 which may be set to regulate the temperature at which the vent valve 316 will be closed, e. g. 212° F. This controller keeps the vent closed during the vulcanizing cycle so that temperature of 212° will keep valve closed. An indicating hand 432 records the temperature taken by the thermometer 324 inside the tank 42. When the vent controller 323 starts operating, that is, after the tank has been filled with steam so that the temperature hand 432 reaches the 212° F. set by the limit hand 431, a valve is opened inside the controller 323, thereby admitting air from source 360 to the diaphragm of the vent valve 316, thereby closing it. As stated above, the position of the pilot valve 344 determines whether the vent controller 323 can actuate the vent valve.

The temperature and condensate controller 326 may be of the type manufactured by the Taylor Instrument Company and sold as "Dubl-Duty Fulscope Controller." The controller 326 may be provided with a recording device, and operates similarly to the controller described above, except that it controls two valves instead of one. The maximum setting 433 for the temperature within the tank should be equal to the setting on the limit hand 431 on the vent controller 323. A temperature hand 434 is actuated by the thermometer 327 within the tank, and so long as the temperature hand records lower than the setting hand, a throttling diaphragm valve 435 operable by the temperature hand 434 of the controller in known manner remains closed to prevent the air supply 360 from entering a pipe 436 to close the steam valve 309. When, however, the temperature is equal to or greater than the maximum set by the hand 433, the valve 435 opens, admitting air from the supply 360 to the other diaphragm of the steam valve 309, to close the valve, thereby shutting off the steam supply in order to prevent the temperature from continuing to rise. A similar throttling valve 437 is placed in the line between the air supply 360 and a pipe 438 which enters the top of the condensate valve 317 above the diaphragm. The control of condensate out of the chamber 312, is dependent on the temperature therein as recorded on the thermometer 330 which actuates a thermometer hand 439. The minimum temperature for the condensate chamber may be predetermined by setting a hand 440 at the desired position. When water passes out of the condensate chamber 312 through the normally open valve 317 to the discharge outlet 320, steam from the tank raises the temperature in the thermometer 330 actuating the hand 439 to keep the valve 437 open and thereby to allow air to flow from the supply 360 to the diaphragm of the valve 317, closing the valve. As condensate water again collects in the chamber 312 and the temperature lowers, the hand 439 will eventually coincide with the hand 440 closing the valve 436 and releasing the pressure on the diaphragm of the condensate valve 317 to open it and again discharge the water from the chamber 312. This throttling operation continues during the entire vulcanizing cycle and prevents excess of condensate from collecting in the bottom of the tank 42. Suitable switches are provided in known manner to operate at the beginning and end of the timer cycle to operate the motor forward or in reverse to open or close the vulcanizer door.

The cycle of operation controlled by the timer 322 and associated mechanism is as follows, after unvulcanized articles including only partially coagulated latex foam articles have been introduced into the vulcanizer 42.

When the push button switch 321 (Fig. 8) is closed, the solenoid 397 is energized, depressing the catch 396 (Fig. 8) the cam surface 395 of which slides along the edge of the terminal 393 to pull the cam follower 390 halfway out of the groove 381. The terminal 393 is caught above the cam surface 395 in the catch 396 and is locked in that position by the latch 398. As the cam follower is in this half way position, away from groove 381 the frame 391 is rocked far enough on the pivot 392 to change the position of switches 403 and 405, and valve 410 by moving the tappets 404, 406, and 414, respectively, upward. This movement actuated by the solenoid simultaneously changes three conditions in the system.

Referring to Figs. 7 and 8, when the cam follower 390 was in the bottom of the cam notch at 381, switch 403 was open, preventing the clock 354 and cam 355 from running; switch 405 was in the down position, supplying current to the high-pressure safety switch 345, which when the vulcanizer steam pressure dropped to zero gauge, in turn energized the connection 407 of the door operation relay 305 to open the door; valve 410 was open, hence timing piston 369 was in its retracted position as shown in Fig. 8; valve 411 was open, supplying air pressure to close the steam valve 309; valve 412 was open, hence no pressure was in the air lines 424 and 426, therefore the door locks were retracted or unlocked; valve 413 was open, hence the piston 369 could not reset the timer. Moving the cam follower 390 to a position 441 (between positions 381 and 383) so tilts the frame 391 that the switch 403 is closed, switch 405 is changed to the "up" position, and valve 410 is closed. Throwing the switch 105 "up" starts the door down so that when the bottom of the door hits the arm 442 of the lower limit switch 347 a relay contained in the limit switch closes and the cam 355 is started since the circuit through the switch 403, the clock motor 354, the limit switch relay 347, and the normally closed pressure switch 341 is made. Closing the valve 410 releases the pressure from the line 409 so that when the cycle has further operated the re-set cylinder 362 may perform its function.

The cam then rotates counter-clockwise as seen in Fig. 7 so that the follower is in position 383, which further pushes lower arm 402 of the frame upward to open the valve 412, admitting air into the pipe 424 and the pipe 442 to open the pressure switch 341 breaking the clock circuit and stopping the cam temporarily. The air also presses the diaphrgams of the pilot valves 342 and 343, respectively, thereby shutting off air from the source 359 to the inlet 427 of valve 342 and opening the vent 428 of valve 342 while closing off the vent 444 in the valve 343 and admitting air from the source 359 to enter the cylinders 332 and 333 and the gasket inlet 352. If the door is in proper closed position, each piston 334 advances the plunger 336 into position within the latch slide 337 so that the door is sealed and locked. If the door is improperly closed, the cycle of the cam remains stopped until this situation is rectified since at this moment the clock motor 354 is not running. When the door is properly closed and the plungers enter the lockholes, both door lock relays 339 and 342 are closed and the open pressure switch 341 is shunted, thereby closing the clock circuit and re-starting the clock motor 354.

The gell portion of the cycle is then timed by the travel of the cam 355 along the cam follower 391 until the follower reaches the next elevation 385. This gell period may be adjusted, for example, from one to ten minutes, by rotating a slide portion on the cam into proper position and locking it. During the gelling period, the steam is shut off by the steam valve 309 since its diaphragm is still depressed by air pressure admitted through the open valve 411; and the vent 313 is open since the vent valve 316 is in its normal open position.

The vulcanizing cycle starts when the cam follower rotates, at position 385. This further raises the frame 391 so that the upper arm 401 closes the valve 411 and the lower arm 402 opens the valve 413. Opening the valve 413 admits air into the re-set cylinder 362 to push piston 369 forward until the bar 371 hits the stop 373, thereby moving the train or gears 364 to rotate the cam counter-clockwise until the portion of the periphery between the cam follower 390 and the position 387 represents the time of the vulcanizing period. Closing the valve 411 releases pressure from the upper diaphragm of the double diaphragm steam valve 309 and allows controller 326 to take over control of inlet steam by passing or shutting off air to the lower diaphragm. At the same time pressure is thereby released from the diaphragm of the pilot valve 344 permitting it to rise to the upper position so that vent 423 is closed and circuit from vent valve 316 to controller 323 is opened. This sets into operation the vent controller 323 which, as described above, closes the vent valve 316 in response to the attaining of a predetermined temperature of the vulcanizer set by the limit hand 431. Referring now to the steam control 326 since the temperature hand 434 is below the limit set by the hand 433, at least at the beginning of the cycle, the steam valve 309 opens. The steam entering the steam inlet 306 within the tank drives the air through the vent 313, until the temperature measured by the thermometer 327 near the vent 313 causes the hand 432 to rise to the position determined by the hand 431 in vent controller 323, which causes the vent valve 316 to close as described above. When the pressure in the tank has risen to the predetermined limit, for example three pounds, it operates through a line 441 to close the normally open pressure switch 346, thereby completing the circuit through the lamp 350 which remains lighted until the pressure drops again to zero.

During the vulcanizing period, the actual operations of maintaining the temperature at the proper level are controlled by the throttling action, described above, of the temperature and condensate controller 326. When the condensate in the chamber 312 reaches too low a temperature, the thermometer hand 439 closes the valve 437 shutting off pressure in the line 438 and allowing the normally open condensate valve 317 to open and the condensate to drain at the outlet 320. As this happens, steam enters the condensate chamber line 311 from the vulcanizing tank 42 and again raises the temperature in the thermometer 330 which actuates the temperature hand 439 to again close the valve 317. The steam inlet 306 is similarly controlled by the temperature hand 434 which opens the valve 435 to close the steam valve 309 when the temperature tends to go higher than the predetermined control point. Both of these throttling actions take place independently throughout the vulcanizing period.

At the end of the vulcanizing period, the cam follower drops into the notch 387 and the reverse of the above operations begins to take place. The valve 413 is again closed by movement of the timing lever 391 and pressure is released from the line 430 leading to the reset cylinder 362 permitting this later to be retracted or reset. At the same time, the valve 411 is opened, shutting off the steam by means of the line 421 leading to the upper diaphragm of the double diaphragm steam valve 309. This air pressure also operates the vent pilot valve 344 so that air from the supply 360 is blocked off, and pressure on the diaphragm of vent valve 316 is released through vent 423 allowing vent valve 316 to open, thus throwing the vent controller 323 out of operation. Steam within the tank may then blow through the vent 313 as the cam follower travels from position 387 to fall into the notch 389.

When the cam follower arrives at notch 389, the valve 412 is closed so that pressure is released from the pressure switch 341 to close it; pressure is likewise released from the air inlet 352 to release the seal around the door. The pilot valve 343 is opened with respect to vent 444 and the line 425 is closed. At the same time the pilot valve 342 has its vent closed and air is admitted through the line 427 from the supply source 359. This pressure is transmitted through the line 429 to the forward inlets 340 of the door locks 332 and 333 to withdraw the plungers 336 from the latch slides 337. The shunt circuit through the door lock relays 338 and 342 is broken, but this does not stop the clock motor 354 since the pressure switch 341 has just previously been closed, as described above, to complete the clock circuit.

When the cam follower drops at the starting position at notch 381, the valve 410 is opened to return the timing piston 369 to its starting position. At the same time the switch 403 is opened to stop the clock and the switch 405 falls into the lower position which re-directs the power line circuit through pressure switch 345. When the pressure within the tank, as measured by the line 441 connected to the pressure switches 345 and 346, drops to zero, the switch 345 closes the circuit from the line to the opening side 407 operating the door relay 305 to reverse the motor 304 and raise the door 302. The lamp 350 goes out as the pressure within the tank drops to zero since the switch 346 is normally open at zero pressure as measured by the line 441 connected with the interior of the vulcanizer.

When the door 302 reaches its top position, it opens the limit switch 349 which is connected in series with the door motor 304 to keep the door open. The vulcanized articles are then withdrawn from the tank 42 and the tank is allowed to cool down to 90°–100° F., at which time it is in condition to receive another truck full of uncured articles. After this truck has been locked in proper position, the push button switch 321 is again closed and the cycle of operations above described is repeated.

Having thus described our invention, what we claim and desire to protect by Letters Patent is:

1. Molding apparatus comprising in combination a support, mold-conveying means movable continuously along the support, a mold adapted to travel along said support in open position, means for connecting the mold to the conveying means, mold filling means disposed above the level of the mold, a support for said filling means disposed along said support, said filling means being adapted to travel along said last mentioned support, a closing station located after the limit of travel of the filling means as regards the direction of movement of the conveying means, and means responsive to movement of the mold to said station for closing the mold while the mold is moving continuously along the support.

2. Molding apparatus comprising in combination a support, mold conveying means movable continuously along the support, means for connecting a mold to the conveying means, an opening station, means responsive to movement of the mold to said opening station for opening the mold while moving continuously along the support, a closing station, a cooling station and a filling station along the conveying means between the opening and closing stations, means responsive to movement of the mold to the closing station for closing the mold while moving continuously along the support, said mold being adapted to move continuously through said opening station, cooling station, filling station and closing station, and means movable along the support for filling the mold while moving continuously between the cooling station and the closing station.

EUGENE A. LUXENBERGER.
GEORGE W. BLAIR.
JOHN F. SCHOTT.